L. B. CASTETS.
APPARATUS FOR THE REGULAR AND CONTINUOUS DISTILLATION OF RESINS.
APPLICATION FILED JUNE 22, 1909.
1,052,214.
Patented Feb. 4, 1913.
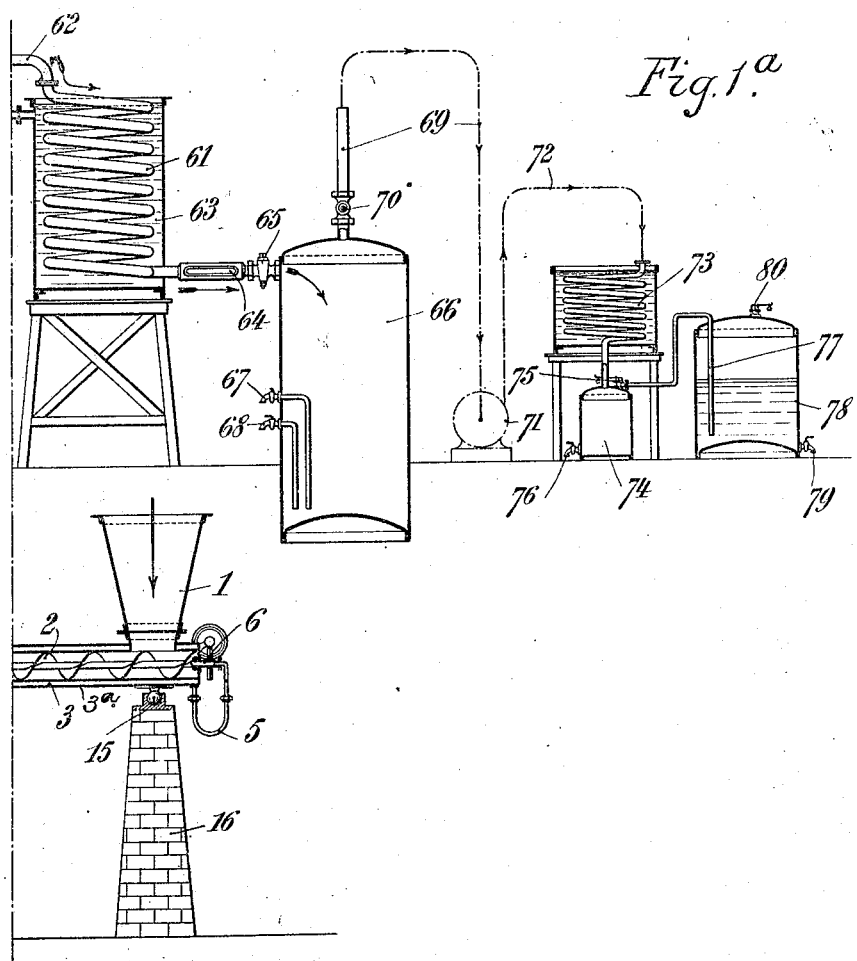
Fig. 1.ª
Witnesses.
Jesse N. Lutton.
R. V. Bonners.
Inventor.
Louis Barthélemy Castets
by Henry Ooth Jr.
Atty.

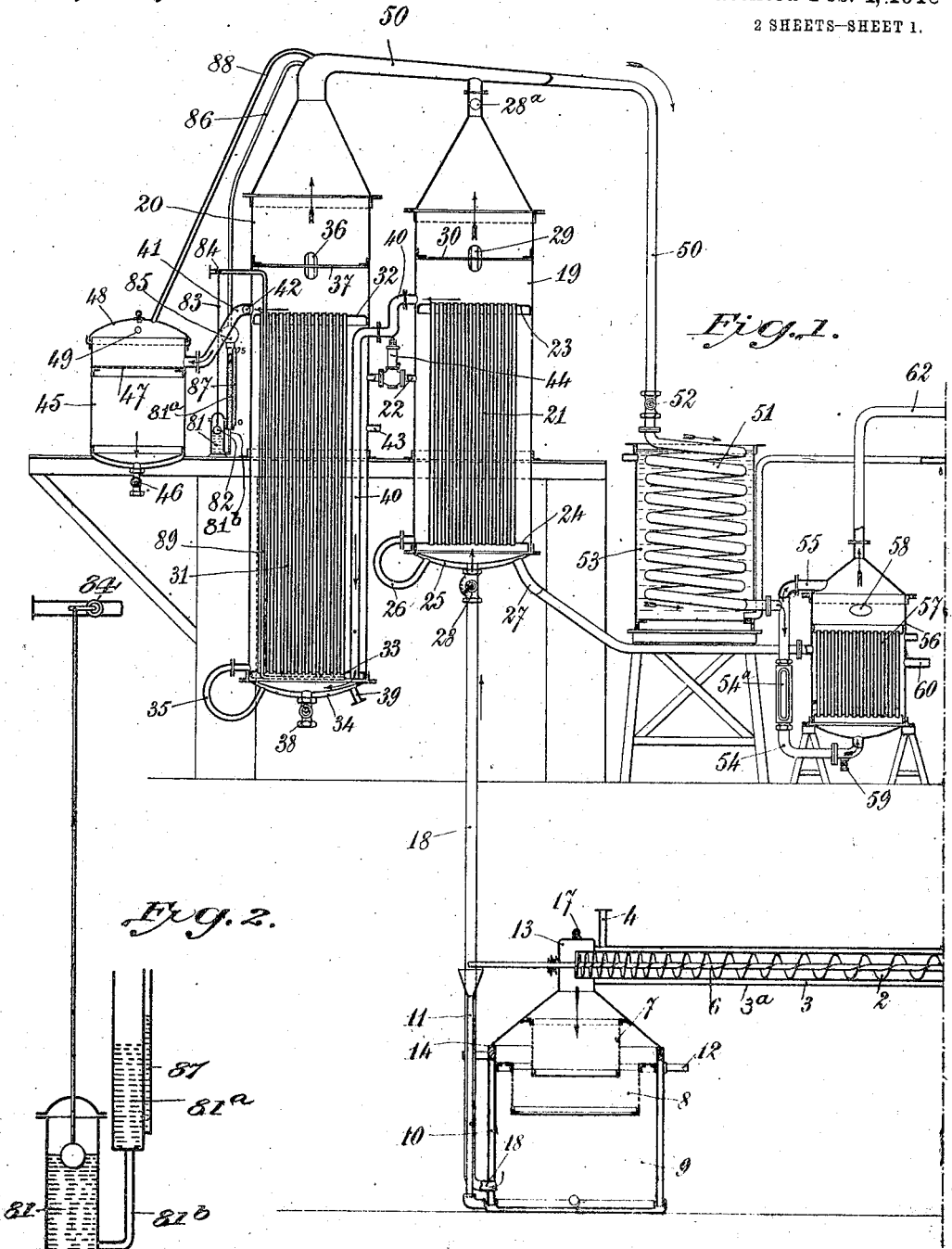

UNITED STATES PATENT OFFICE.

LOUIS BARTHÉLEMY CASTETS, OF LALUQUE, FRANCE.

APPARATUS FOR THE REGULAR AND CONTINUOUS DISTILLATION OF RESINS.

1,052,214. Specification of Letters Patent. Patented Feb. 4, 1913.

Application filed June 22, 1909. Serial No. 503,615.

*To all whom it may concern:*

Be it known that I, LOUIS BARTHÉLEMY CASTETS, a citizen of the Republic of France, and residing at Laluque, Landes, in the said Republic, engineer, have invented certain new and useful Improvements in Apparatus for the Regular and Continuous Distillation of Resins; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The invention relates to an apparatus for the distillation of resins and has for its object to insure a continuity of the operation owing to the regular travel of the products in a constant forward direction and to effect a large production and a very efficient output.

A further object is to provide for the collection of the whole of the utilizable essences contained in the gums treated and a collection of the combustible gases which are not condensed, as well as of the residual liquids from distillation.

This apparatus consists essentially in providing a series of distilling columns which are subjected to the action of a vacuum and heated by the steam which circulates through the apparatus in the inverse order of the progress of the distillation, said steam then proceeding to heat a rectifying apparatus where, after condensation and still under vaccum, a new distillation is effected of the products which have not been distilled in the preceding distillation.

The invention further consists in providing refrigerating coils serving to condense, either under a vacuum or under a slight pressure, the vapors produced by the distillation, which, when first liquefied, are, as well as the residual liquids from distillation, collected in reservoirs provided for this purpose. To this distilling apparatus is added what is preferably termed a preparatory apparatus, in which the gums constituting the raw material are progressively crushed and triturated under heat, then dissolved and separated from the solid residues, so as to obtain a homogeneous liquid which, under the action of a vacuum maintained in the distilling apparatus, passes into the distilling columns. An automatic governor insures the regularity of the distillation by producing an automatic delivery of steam into the liquid being distilled, as soon as the vacuum diminishes in the whole of the apparatus, so as to always reëstablish the equilibrium of the distillation.

In the accompanying drawings:—Figure 1 is a diagrammatic elevation of one portion of the apparatus and Fig 1ª is a like view of another portion thereof. Fig. 2 is a view, on a larger scale, of the automatic adjuster shown on Fig. 1.

The preparatory apparatus comprises a hopper 1, into which the raw gum is introduced and which opens below into a mixer comprising an endless conveyer screw 2 rotatably mounted in a casing 3. The convolutions of said screw diminish continuously so as to act on the material with a gradually increasing pressure. Surrounding the casing 3 of screw 2 is a jacket 3ª through which circulates steam which enters through a pipe 4 and passes out through a tube 5 into the hollow axle 6 of the screw 2 so as to communicate heat to the convolutions of the screw to insure a uniform heating of the material in all directions; thus raising the temperature of the mass to about 80° or 90° C. Beneath the discharge end of the endless screw a primary filter 7 is arranged, into which flows the triturated and liquefied material and which is intended to arrest the chips and impurities of large size. Beneath the filter 7 is situated a second filter 8 where the mass undergoes a complete filtration, so as to flow in a perfectly homogeneous state into a lower reservoir 9. This latter comprises a jacket 10, through which circulates the condensed steam which flows from the hollow shaft 6 of the endless screw into a conduit 11 whence it passes into the jacket 10; the evacuation of this condensed steam occurs at 12. The operation of filtration of the dissolved and triturated mass, upon the filters 7 and 8, takes place under exclusion of air, the reservoir 9 being covered by a hood 13 the close joint of which at the base is insured by a hydraulic joint 14. The front extremity of the conduit of the endless screw is supported by a spherical pivot 15 on a supporting column 16, so that by raising the hood 13 by means of the upper lifting rings 17, the whole mixer may be caused to turn on the pivot 15 in order to enable the cleaning of the filters to be effected. A tube 18 connects the lower part of the reservoir 9 with the distilling apparatus hereinafter described and through said tube the liquid, which is contained in the reservoir is caused to rise by means of a vacuum created in the distilling apparatus by the pump shown at 71, Fig. 1, as will be also hereinafter described.

The distillation apparatus comprises two distilling columns 19 and 20. The first column 19 contains an interior series of tubes 21 heated by steam which comes from a pipe 22 and is confined for a time between the two tube plates 23 and 24 of this series through which the liquid being distilled circulates. The column 19 has a double bottom 25, into which the steam after circulating around the series of pipes 21, passes by means of a pipe 26, and escapes from said bottom into a pipe 27. The liquid to be distilled enters at the lower part of the column 19 from tube 18 which is provided with a regulating cock 28. The distilling column is provided at its upper part with a tap 28ª, which when closed causes column 19 to discharge through pipe 40 into column 20. The distilling column 19 is also provided with an inspection glass 29 as well as a perforated partition plate 30 acting as a liquid separator.

The second distilling column 20 is similar to the preceding one and like the latter it comprises a series of tubes 31 mounted between two plates 32 and 33, a double bottom 34, a steam circulation pipe 35, an upper inspection opening 36 and a partition plate 37. But at the lower part, instead of a tube 18, is situated a discharge cock 38; further, the escape of the condensed steam from the double bottom 34 is effected through a discharge pipe 39. The passage of the liquid under treatment from the first to the second column is through a pipe 40 opening a little above the upper tube plate 23 of column 19 and descending beneath the lower tube plates 33 of column 20; the escape of the liquid from this latter is effected through a pipe 41 opening slightly above the upper tube plate 32 of column 20 and controlled by a cock, situated in the pipe 41 at 42.

The steam which circulates around the series of tubes 31 enters the column 20 through a side pipe 43, and it passes from column 20 to column 19 by the pipe 22 which is provided with an expander 44. The steam admitted to the series of tubes 31 is saturated steam at 3 atmospheres, that is to say at 134° C; and the expander 44 expands the steam to 1 atmosphere so that it has only a temperature of 100° C., when admitted to the series 21. Beyond the second distilling column 20 is situated a colophony reservoir 45 provided at its lower end with a discharge cock 46 and at its upper part with a filter 47, above which a pipe 41 from the column 20 enters. In the cover 48 of the reservoir 45 is arranged an inspection glass 49 to permit of the level of the liquid in this reservoir being ascertained. In order to insure the continuous operation of the apparatus different colophony reservoirs may be alternately placed in communication with the column 20. The two distilling columns 19 and 20 open at their upper part into a collecting tube 50 which leads to a condensing coil 51, at the entrance of which is arranged a cock 52, said coil being situated in a refrigerating vat 53. Branch tubes 54, 55 form a continuation of the coil 51, the descending tube 54 being fitted with an inspection glass 54ª; it serves for the passage of the condensed liquid, while the ascending tube 55 serves for the passage of the vapors which have escaped condensation. The first of these branch tubes opens into the lower part and the latter into the upper part of a rectifier 56. The rectifier presents, on a smaller scale, the same arrangement as the distilling columns 19 and 20. The spirit rectifier 56 thus comprises a series of tubes 57 and an orifice closed by a plug or stopper 58 and permits of the introduction of a certain quantity of suitable crystals, preferably consisting in part of chlorid of calcium and of soda, so as to neutralize the spirits. It is in this part of the apparatus that the rectification is effected by second distillation. In the tube 54, an escape cock 59 is provided, and at 60 is arranged an automatic discharge for condensed steam, the rectifier being heated by the steam which proceeds from the first distilling column 19 by pipe 27. A second condensing coil 61, communicating by tube 62 with the rectifier 56 and immersed in the refrigeration vat 63, permits of the condensation of the spirits disengaged by the rectification. The products of condensation pass through a tube provided with an inspection opening 64 and with a cock 65 into a spirit reservoir 66, which is provided with the two draw-off tubes having cocks 67 and 68.

The spirit reservoir 66 communicates through a suction pipe 69 provided with a cock 70, with an air pump 71 of any suitable type, serving to maintain a vacuum throughout the whole apparatus. The outlet pipe 72 of this pump leads to another condensing coil 73 into which the gases, which have survived the preceding condensation effected under vacuum, are forced at a pressure of 1 atmosphere, and are then, to a large extent, condensed and flow out into a lower receptacle 74 provided with a safety valve 75 and a discharge cock 76. This receptacle 74 communicates by a descending tube 77, with a reservoir 78 containing at the beginning heavy spirits, in which the major part of the extra-light uncondensed spirits become dissolved. The reservoir 78 is furnished with a discharge cock 79 and a safety valve 80 through which the uncondensable but combustible gases escape, and are conveyed to the furnaces of steam generators (not shown).

The automatic adjustment of the apparatus is effected by a receptacle which has two arms 81 and 81$^a$ connected by a tube 81$^b$, containing mercury the displacement of which in arm 81 actuates a float 82 which through a rod 83 controls the opening of a steam supply valve 84. The main branch of the receptacle 81$^a$ is surmounted by a bell 85 for preventing sudden shocks to the mercury column which communicates through a tube 86 with the collector 50 of the distilling columns, so that the mercury in the receptacle 81$^a$ is influenced by the vacuum pump 71. This arm 81$^a$ has graduations 87 enabling the extent of the vacuum, which exists in the apparatus, to be observed. When the degree of exhaustion in the entire apparatus changes, the mercury rises or descends more or less in the larger branch of the tube 81, in consequence of which the float 82, arranged in the other branch, rises or falls in a corresponding manner; as this rise or fall operates the valve 84, for admitting steam, the control of the latter is consequently directly produced by the degree of vacuum in the apparatus, in such a manner that the admission of steam is increased when the vacuum decreases and is diminished when the contrary is the case. A tube 88 places the colophony reservoir 45 in communication with the collector 50 and permits the action of the vacuum to be also exercised in this reservoir.

The operation of the apparatus is as follows: The raw gum is introduced into the hopper 1 of the preparatory apparatus and is carried forward by the endless screw 2, in the casing of which it is crushed and liquefied. The liquid product is purified in its passage through the filters 7 and 8 and collects in the lower reservoir 9, whence it is raised into the distilling apparatus by suction caused by the vacuum in the apparatus proper, the quantities raised being regulated by the opening of the supply valve 28. The air pump 71 producing the vacuum in the apparatus, the cocks 70, 65, 52 and 28$^a$ being open, the vacuum is raised until the mercury of the regulator indicates a vacuum of 70 centimeters below atmospheric pressure on the graduation 87; then the float 82 will be in a position to cause the rod 83 to close the steam supply valve 84. Steam at three atmospheres is then introduced through pipe 43 and after its passage through the expander 44 it is lowered to 1 atmosphere so that the column 20 will be heated to 134° C., and the column 19 as well as the rectifier 56 to 100° C., only. The opening of valve 28 then permits the melted gum contained in reservoir 9 to be sucked through pipe 18, enter column 19, pass through the series of tubes 21, spread itself out in a thin layer on the upper tube plate 23 and pass by tube 40 into the second column 20. In its passage through the series of tubes 21, the gum is raised to a temperature of 100° C., and a starting of the distillation will occur which involves the whole of the water contained naturally in the gum, plus an appreciable quantity of the spirit of turpentine. These first vapors pass into the collector 50. The liquid gums passing by tube 40 into the column 20 ascend through the series of tubes 31, where under the temperature of 134° C., which is obtained there, they give up all the spirits of turpentine which they contain, and which also proceed to the collector 50. The gum (now transformed into colophony or pitch) spreads itself out in a thin layer on the upper tube plate 32 and passes by tube 41 into the colophony reservoir 45, where it is filtered and whence it is drawn off through cock 46. The circulation of the liquid from one distilling column to the other and in the colophony reservoir is effected by the difference of level which, as will be seen in the drawing, exists between these three elements. The vapors proceeding from the distillation in the two columns unite in the collector 50 and are condensed together in the refrigerator 51. The condensed liquid passes through the descending tube 54 with its inspection opening 54$^a$ into the rectifier 56, where the neutralization of the spirits and their fresh distillation is effected. The vapors produced, as well as those passing by the ascending tube 55, proceed to be condensed together in the second refrigerator 61, the condensed liquid flowing out through the tube having the inspection opening 64, into the spirit reservoir 66. The uncondensed vapors, composed of light spirits and some uncondensable gases, are forced out by pump 71 into refrigerating coil 73 at a pressure of 1 atmosphere above atmospheric pressure, and are condensed and flow into the reservoir 74. The extra light spirits then pass to be broken up in heavy spirits contained in reservoir 78, while the combustible gases escape through valve 80. In the drawing, the unfeathered arrows indicate the travel of the solid and liquid products, while the feathered arrows indicate the path of travel of the gaseous products of distillation.

The mercury regulator, while acting as a vacuum indicator, has, as already stated, the object of maintaining the equilibrium of distillation and this without augmenting the temperature in the distilling columns. In fact if for any reason the vacuum should diminish, the column of mercury descends in the long arm of the receptacle 81, and ascends in the other arm and thus raises the float 82 which opens the steam supply valve 84. The steam thus passing through tube 89 to the bottom of the distilling column 20 will be injected into the mass contained therein and in this manner insure the total elimination of the spirits.

It is evident that instead of two distilling columns, a larger number may be employed which will always be arranged in series; the same applies to the condensing refrigerators, the number of which and their arrangement may evidently vary according to the nature of the products to be treated. In the same way the details of construction of the apparatus described and shown may be modified without departing from the principle of the invention.

I claim:—

Apparatus for the regular and continuous distillation of resins, comprising means for the preparatory treatment of the raw gums, a series of distilling columns gravity discharging from one to the other and above the preparatory means, series of tubes situated in said columns and heated by steam which circulates in the opposite direction to that of the distillate, a reservoir for collecting the residual liquid from the distillation and connected to the vapor discharge of said columns, refrigerating coils for condensing the distilled products, a rectifier for again distilling the condensed liquid with the addition of suitable products, a series of tubes arranged in said rectifier and heated by steam, condensation coils, a reservoir for the condensed products; a pump for maintaining a vacuum in all the above-mentioned apparatus and thereby causing the continuous elevation of the gums to the first of the series of stills, a plurality of refrigerators to receive and condense the products forced therein under slight pressure by said pump, a reservoir for collecting the condensed product, a reservoir receiving the extra light uncondensed spirits, and heavy spirits in this reservoir for dissolving these extra light spirits.

In testimony that I claim the foregoing as my invention, I have signed my name in presence of two subscribing witnesses.

LOUIS BARTHÉLEMY CASTETS.

Witnesses:
A. RENAUD,
J. D. WISE.